Figure 1:
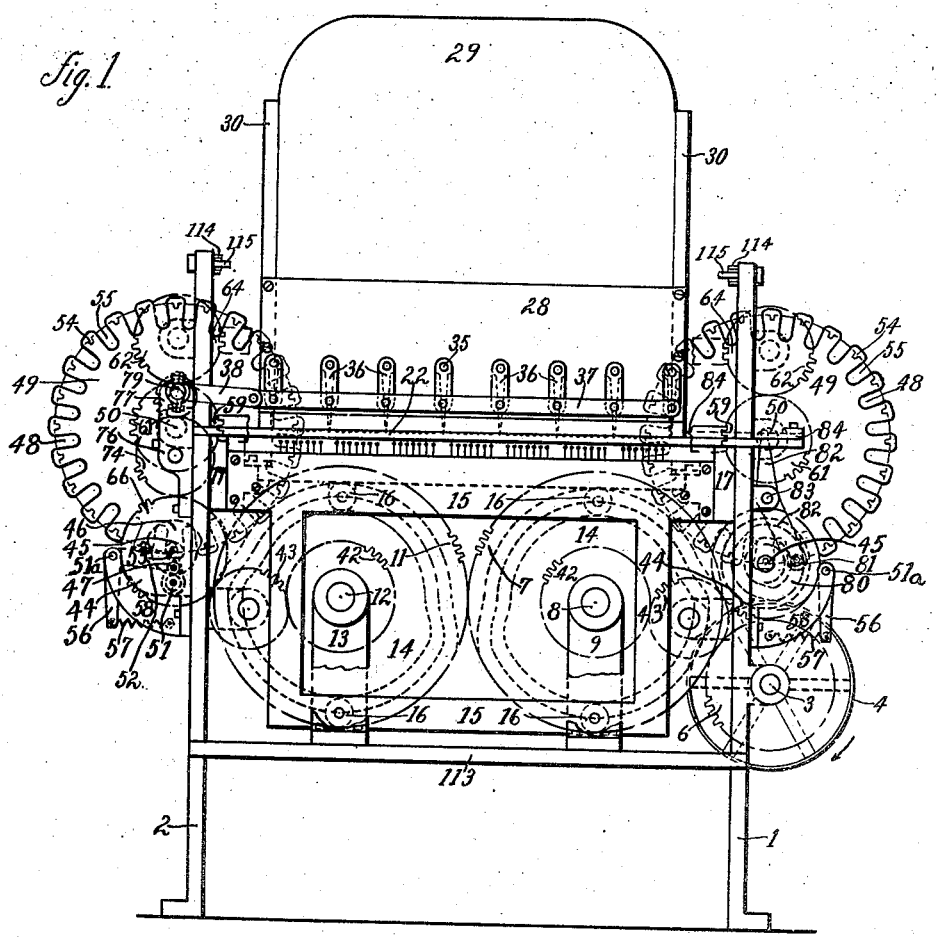

F. SCHAFER.
MATCH MAKING MACHINE.
APPLICATION FILED MAY 21, 1908. RENEWED SEPT. 9, 1913.

1,090,569.

Patented Mar. 17, 1914.
9 SHEETS—SHEET 1.

Witnesses
G. C. Popein
W. A. Stroud

Inventor
Frank Schafer.

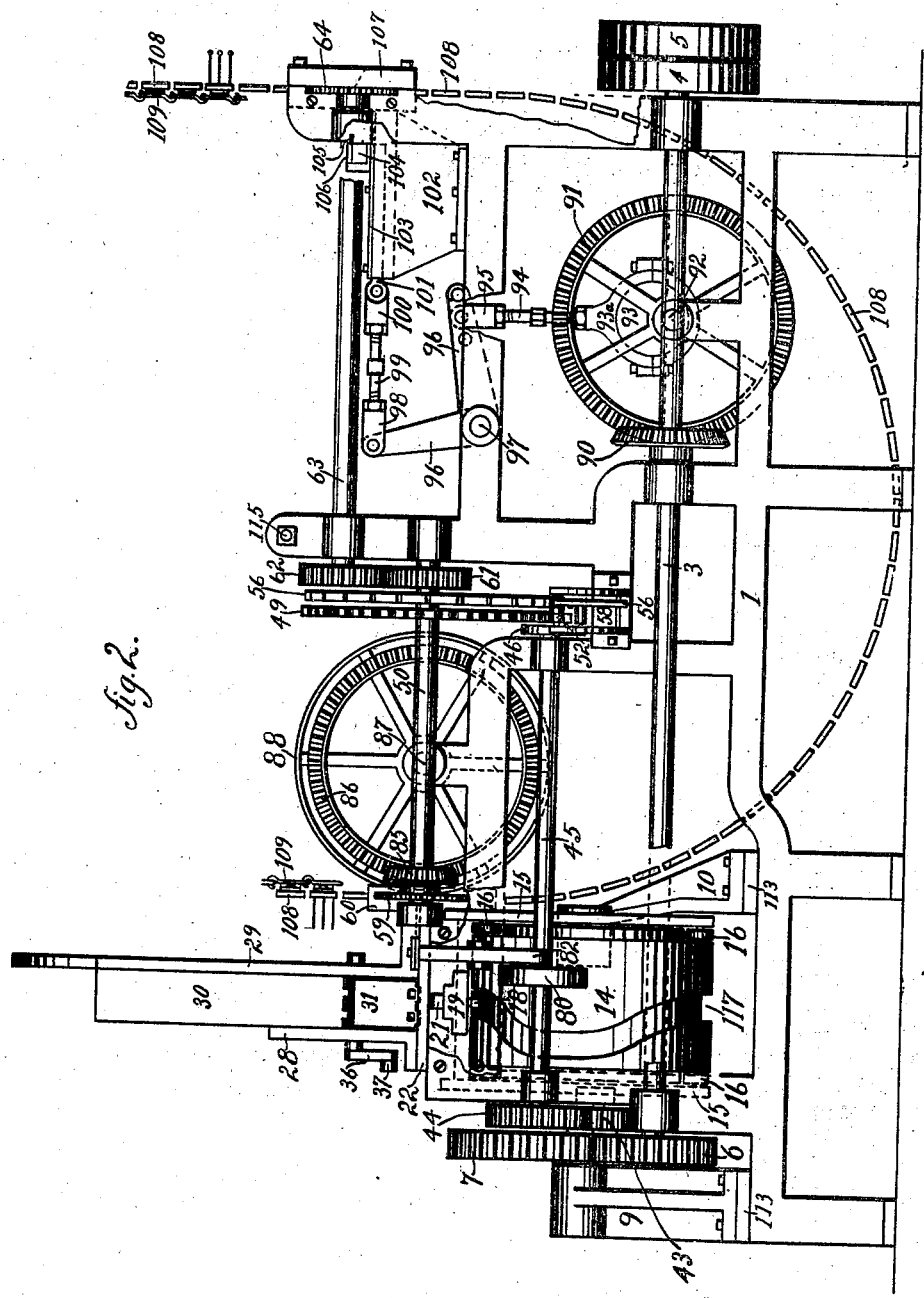

F. SCHAFER.
MATCH MAKING MACHINE.
APPLICATION FILED MAY 21, 1908. RENEWED SEPT. 9, 1913.
1,090,569.
Patented Mar. 17, 1914.
9 SHEETS—SHEET 3.
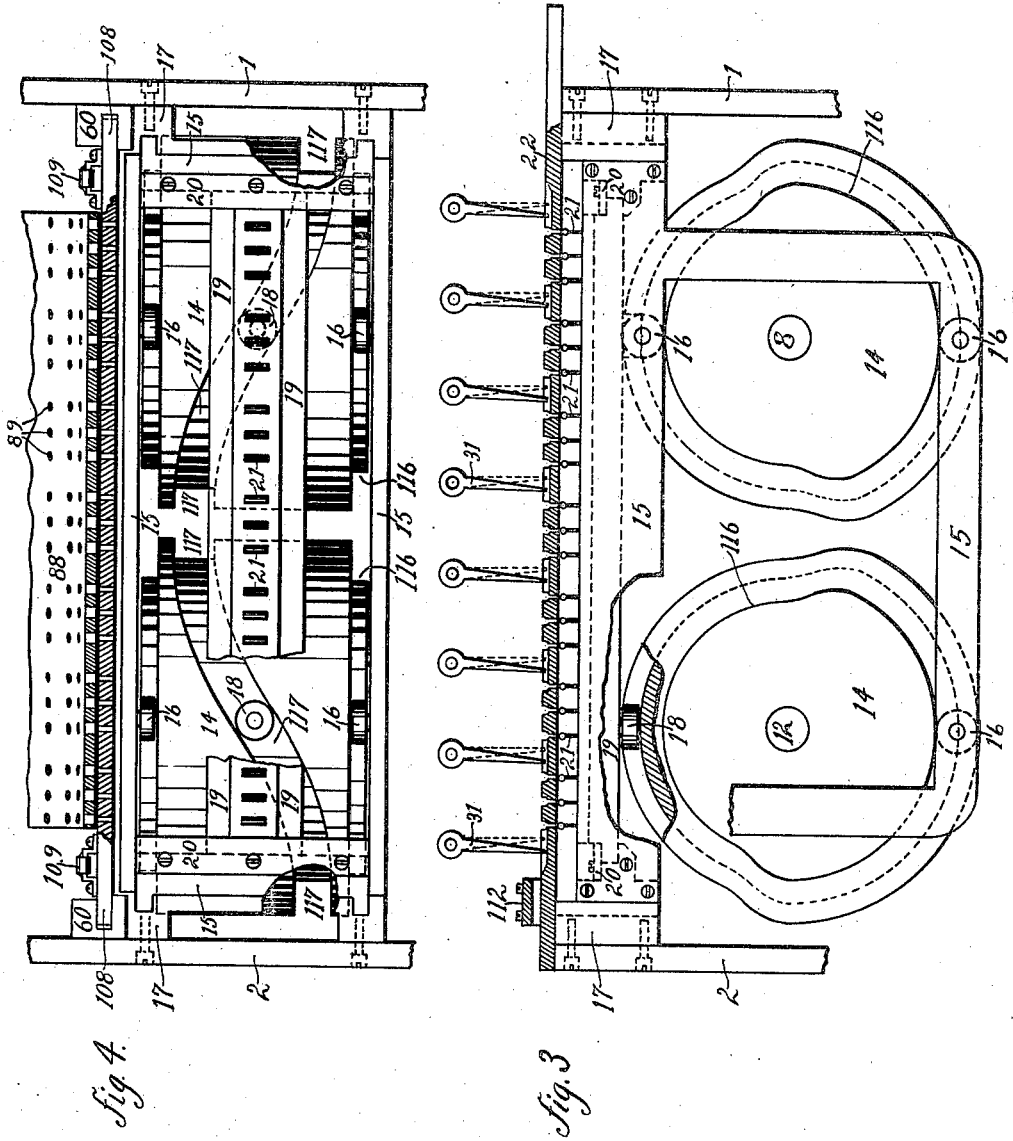
WITNESSES:
G. C. Popein
W. A. Stroud
INVENTOR
Frank Schafer E. SCHAFER.
MATCH MAKING MACHINE.
APPLICATION FILED MAY 21, 1908. RENEWED SEPT. 9, 1913.
1,090,569.
Patented Mar. 17, 1914.
3 SHEETS—SHEET 4.
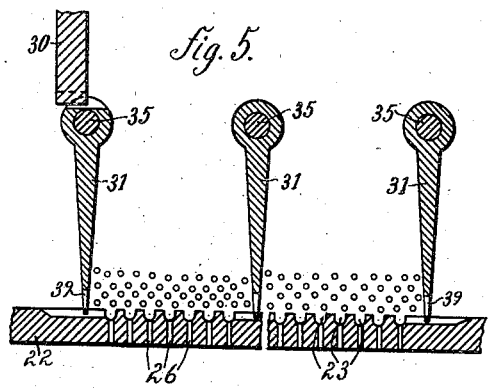
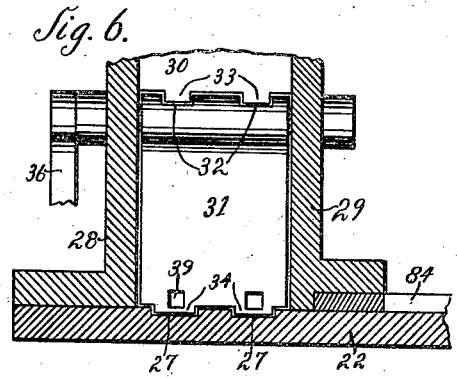
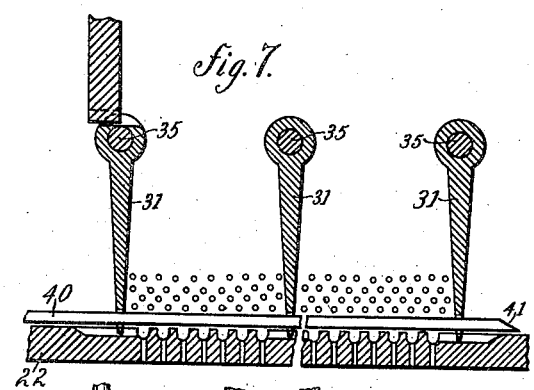
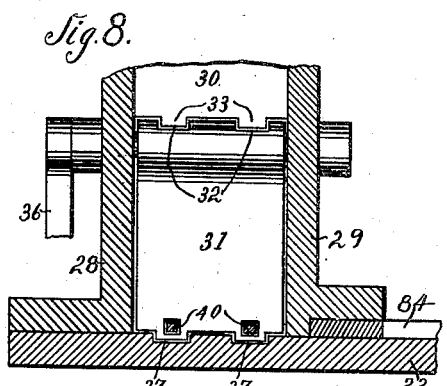
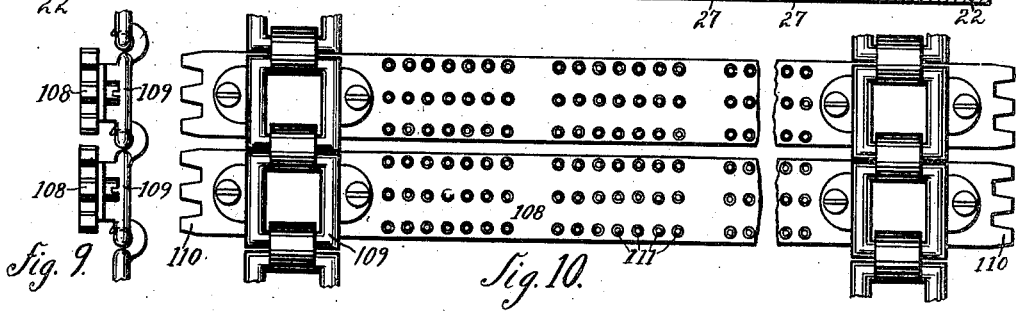
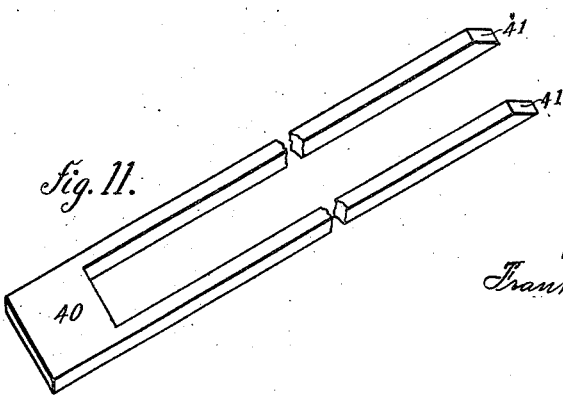
WITNESSES:
G. C. Popein
W. A. Stroud
INVENTOR
Frank Schafer F. SCHAFER.
MATCH MAKING MACHINE.
APPLICATION FILED MAY 21, 1908. RENEWED SEPT. 9, 1913.
1,090,569.
Patented Mar. 17, 1914.
9 SHEETS—SHEET 5.
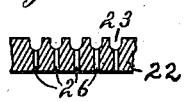 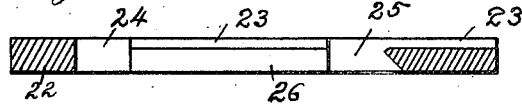
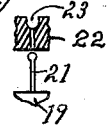 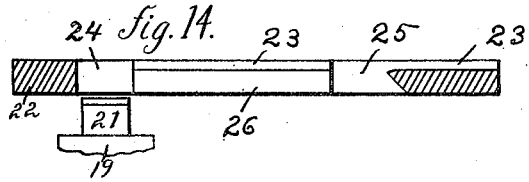
 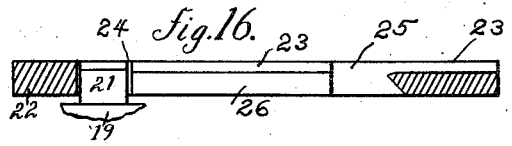
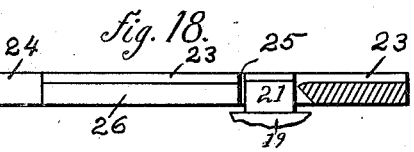
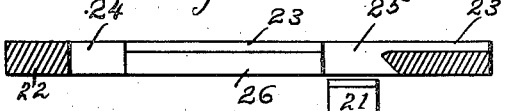
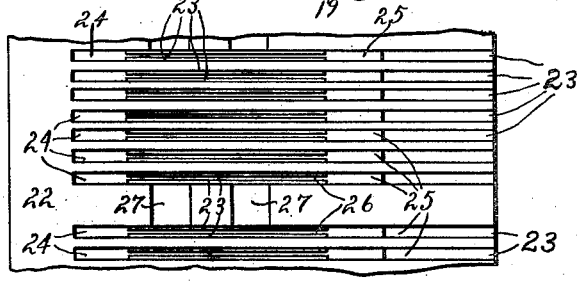
WITNESSES:
INVENTOR
Frank Schafer F. SCHAFER.
MATCH MAKING MACHINE.
APPLICATION FILED MAY 21, 1908. RENEWED SEPT. 9, 1913.

1,090,569.

Patented Mar. 17, 1914.

9 SHEETS—SHEET 6.

WITNESSES:
G. C. Popein
W. A. Stroud

INVENTOR
Frank Schafer.

F. SCHAFER.
MATCH MAKING MACHINE.
APPLICATION FILED MAY 21, 1908. RENEWED SEPT. 9, 1913.
1,090,569.
Patented Mar. 17, 1914.
9 SHEETS—SHEET 7.
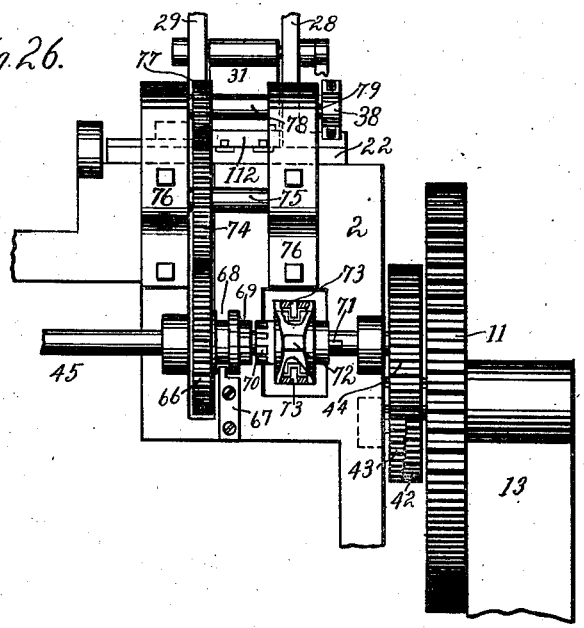
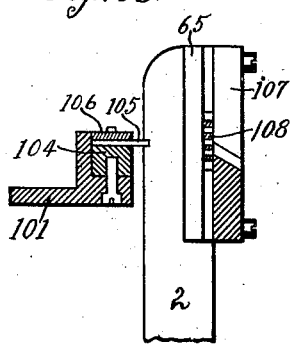
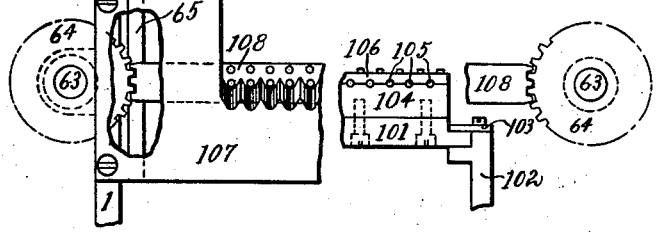
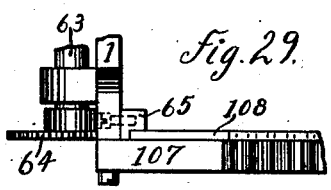
WITNESSES:
INVENTOR
Frank Schafer F. SCHAFER.
MATCH MAKING MACHINE.
APPLICATION FILED MAY 21, 1908. RENEWED SEPT. 9, 1913.
1,090,569.
Patented Mar. 17, 1914.
9 SHEETS—SHEET 8.
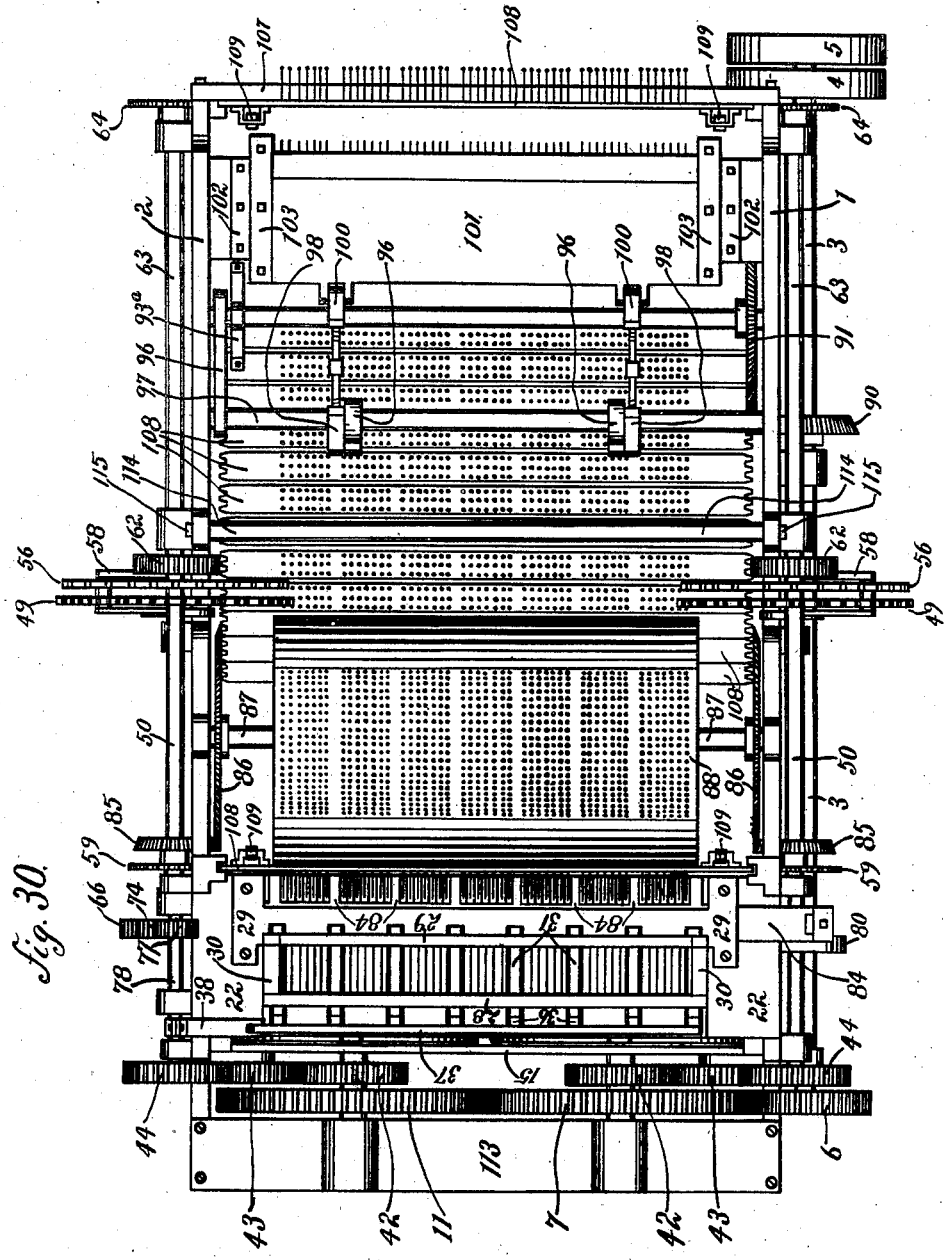
WITNESSES:
INVENTOR
Frank Schafer F. SCHAFER.
MATCH MAKING MACHINE.
APPLICATION FILED MAY 21, 1908. RENEWED SEPT. 9, 1913.
1,090,569.
Patented Mar. 17, 1914.
9 SHEETS—SHEET 9.
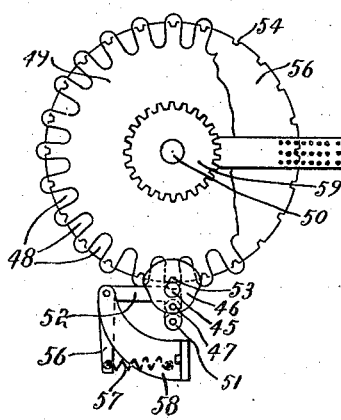
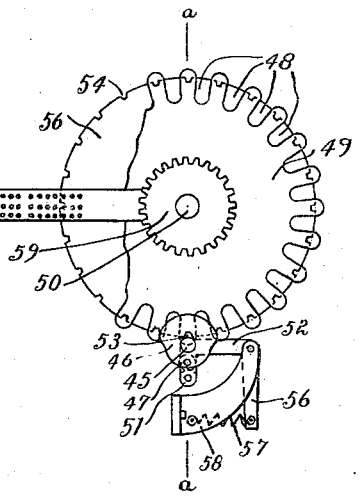
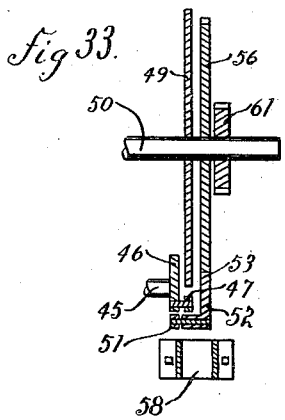
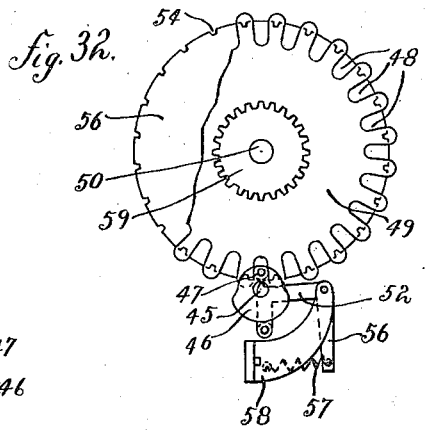
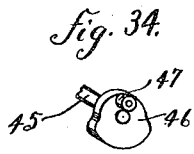
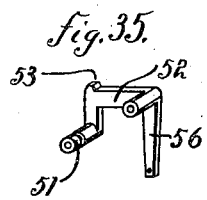
WITNESSES:
Henry Born
Carrie E. Schafer
INVENTOR
Frank Schafer.

UNITED STATES PATENT OFFICE.

FRANK SCHAFER, OF RONDA, NORTH CAROLINA, ASSIGNOR TO THE DIAMOND MATCH COMPANY, OF CHICAGO, ILLINOIS, A CORPORATION OF ILLINOIS.

MATCH-MAKING MACHINE.

1,090,569.     Specification of Letters Patent.     Patented Mar. 17, 1914.

Application filed May 21, 1908, Serial No. 434,063. Renewed September 9, 1913. Serial No. 788,934.

*To all whom it may concern:*

Be it known that I, FRANK SCHAFER, a citizen of the United States, residing at Ronda, county of Wilkes, State of North Carolina, have invented a new and useful Improvement in Match-Making Machines, which improvement is fully set forth in the following specification and accompanying drawings.

This invention relates to match making machines in which the splints are cut the length of a match from any suitable wood, dried and then placed in the machine which feeds them to an endless carrier which conveys them over heating plates, paraffin pans and dipping devices, making the complete match and ejecting them from the carrier at a suitable place in the machine.

It also consists of a plurality of vibrating partitions in the splint feeding hopper, of a grooved plate to support the splints and slots therein in which moves an inserter head having a peculiar movement.

It also consists of novel means of stopping the feeding of the splints and also stopping the vibration of the partitions in the hopper.

It also consists of a simple and inexpensive carrier chain for the matches.

It also consists of simple means of causing the holes in the carrier chain to register with the inserter and ejector heads and locking them in position during the insertion of the splint and the ejecting of the match.

It further consists of details of construction all as will be hereinafter set forth.

Figure 21:
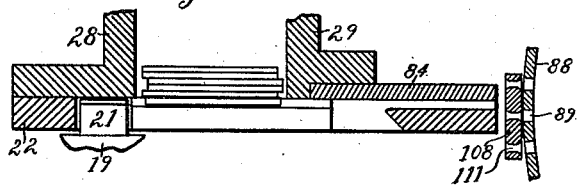
Figure 22:
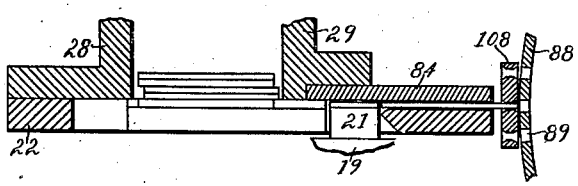
Figure 23:
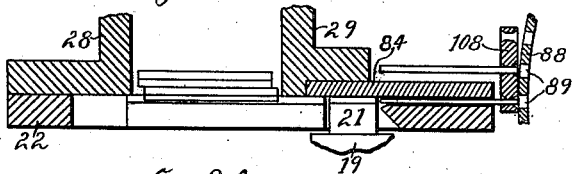
Figure 24:
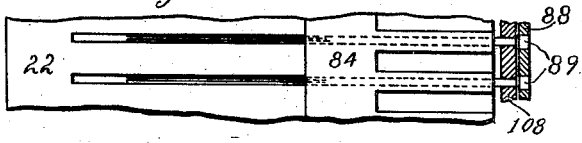
Figure 25:
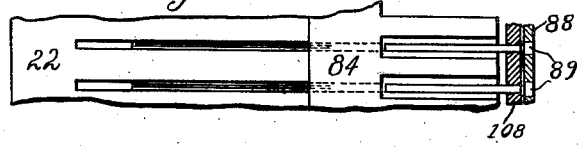

Figure 1 represents a front view of a machine embodying my invention. Fig. 2 represents a side elevation of same. Fig. 3 represents an enlarged view of the cams operating the inserter head, the stationary grooved splint plate, and the vibrating partitions of the hopper. Fig. 4 is a plan view of Fig. 3, partly sectional, with the stationary grooved splint plate removed, and also showing the match carrier plate and the abutment drum. Fig. 5 is a sectional view of the vibrating partitions and grooved splint plate. Fig. 6 is a view showing the sides of the splint hopper and the holes in the vibrating partitions for the insertion of the fork which stops the feeding of the splints. Fig. 7 is a sectional view showing the fork stopping the feeding of the splints. Fig. 8 is a view similar to Fig. 6 showing the fork inserted. Fig. 9 is an end view of the match carrier plate and standard malleable-iron link chain connecting them into an endless carrier. Fig. 10 is a plan view of same. Fig. 11 is a perspective view of the fork, which when inserted in the holes of the vibrating partitions stops the feeding of the splints. Fig. 12 is a sectional view of the grooved splint plate through one of the slots. Fig. 13 is a sectional view across the slots of the grooved splint plate. Fig. 14 is a view showing the first position of the inserter head. Fig. 15 is an end view thereof, partly sectional. Fig. 16 is the second position of the inserter head. Fig. 17 is an end view thereof, partly sectional with the inserter in the slot. Fig. 18 is the third position of the inserter head. Fig. 19 is the fourth position of the inserter head. Fig. 20 is a plan view of a section of the grooved splint plate. Fig. 21 is a sectional view showing the splints in the hopper, the grooved splint plate, the inserter head, a plate of the carrier chain and the abutment drum. Fig. 22 is a view showing the inserter head inserting a splint in the carrier plate and the guiding comb. Fig. 23 is a view showing the continued action of the inserter head and the guiding comb and the position of the splint above the guiding comb. Fig. 24 shows the guiding comb guiding the splints while being inserted in the carrier plate. Fig. 25 shows the guiding comb moved to one side to permit the upward movement of the splint and carrier plate. Fig. 26 is a view showing the guide for the fork that stops the feeding of the splints and the clutch to stop the vibration of the hopper partitions. Fig. 27 is an end view showing the match carrier plate, the gears moving same, the ejector head and the plate which supports the match carrier plate during the ejecting of the matches. Fig. 28 is a sectional view of the ejector head, supporting plate and guide for the match carrier plate. Fig. 29 is a part plan view of Fig. 27. Fig. 30 represents a plan view of the machine. Fig. 31 represents an end elevation of the feed and locking mechanism. Fig. 32 represents a view of part of the mechanism of Fig. 31 showing the cam disk moving the plate and releasing the locking lever. Fig. 33 represents a sectional view on lines a—a of Fig. 31. Fig. 34 represents a perspective view of the cam disk. Fig. 35 represents a perspective view of the locking lever and cam roller.

Similar numerals indicate corresponding parts in the several figures.

Referring to the drawings:—1 designates the right hand frame of the machine and 2 the left hand frame.

3 designates the main driving shaft which rotates in suitable bearings on the frame 1.

4 and 5 designate tight and loose pulleys on the shaft 3. 6 designates a gear secured to the end of this shaft and which meshes with a larger gear 7 secured to shaft 8 which rotates in the front bearing 9 and the rear bearing 10, it will be noted that the rear bearing extends into the large drum 14 which is bored out to permit it to run on the outside of the bearing 10.

11 designates a large gear similar to gear 7 and with which it meshes, and which is secured to shaft 12. This shaft rotates in a bearing 13, the rear bearing not being shown.

14 designates two drums one of which is right hand and one left hand, it will be noted that both sides are cam shaped (116) and there is also a cam slot (117) on the periphery, the side cams are so shaped that they raise and lower a vertically moving slide 15 and also hold this slide stationary during a part of the revolution of the cam and while the vertically moving slide is stationary the cam slot 117 is moving a slide longitudinally of the machine which slides in ways on the vertical slide, and the cams are so shaped that when one movement ends the other begins and the purpose of which movements will be hereinafter explained.

16 designates friction rollers rotating on suitable pins or bolts secured to the slide 15 and which ride on the cam 116 on the sides of the drums 14, see Figs. 1, 2, 3 and 4.

17 designates the guides which are secured to the frames 1 and 2 and which guide the vertical movement of the slide 15.

18 designates a friction roller moving in the cam slot 117 on the face of the periphery of the drum 14 and which rotates on suitable bolts secured to the slide 19, this slide moves longitudinally on the machine on the vertically moving slide 15 and which is held in place by the gib 20, see Figs. 3 and 4.

21 designates the inserter secured to the slide 19 for a purpose which will be hereinafter explained.

22 designates a plate secured to frames 1 and 2 and on the top face of which are the grooves 23 which extend nearly across said plate.

24 designates slots going through the plate at the front end, and 25 similar slots also going through the plate near the rear end, and 26 designates slots going through the plate between slots 24 and 25 and directly in the center of the groove 23 and the purpose of which grooves and slots will be hereinafter explained.

27 designates grooves running at right angles to the aforementioned grooves and in which move the tongues 34 of the vibrating partitions 31.

28 designates the front plate of the splint hopper, 29 the back plate and 30 the two sides thereof.

31 designates the vibrating partitions of the splint hopper which are secured to the shafts 35 moving in suitable bearings cast on the front and back plates of the hopper, and in which are the grooves 32 for the tongues 33 of the hopper sides 30.

34 designates tongues of the partitions 31 which extend in the grooves 27 of the plate 22.

36 designates the arms secured to shafts 35 and to which is pivoted the connecting arm 37 which causes all the partitions 31 to vibrate in unison and which is pivoted to the eccentric rod 38, see Fig. 1.

39 designates square holes cut in the partitions 31, in which is entered the tangs of the fork 40 having the beveled end 41 which lifts the splints from off of the grooved splint plate and does not permit them to fall into the grooves 23. The fork 40 being guided by the bracket 112 secured to the top of the plate 22. See Figs. 3 and 26.

Beginning with 42 and until otherwise stated all parts designated will be double, that is, one on each side of the machine and working in unison.

42 designates gears secured to shafts 8 and 12 and which mesh with gears 43 rotating on studs secured to a bracket extending inwardly from frames 1 and 2 and which also mesh with gear 44 secured to shaft 45 which rotates in suitable bearings on the sides of frames 1 and 2. 46 designates a disk secured to the end of shaft 45 on the face of which is pivoted a friction roller 47 which enters the slot 48 of the wheel 49 secured to shaft 50, the periphery of the disk 46 is shaped into a cam on which rides a friction roller 51 which rotates on a suitable pin on the end of the lever 52, the other end of the lever 52 is shaped into a tooth 53 which fits into a notch 54 on the face of the wheel 55, which is secured to the shaft 50, the lever 52 is bent at right angles into the end 56 to which is secured the end of the spring 57, this spring is hooked to a pin going through the bracket 58, secured to the sides of the frames 1 and 2. The parts numbered from 46 to 58 form the well known roll intermittent feed and automatic lock during one-half revolution. 59 designates a narrow gear wheel secured to the end of shaft 50 and which moves in a slot cut in the guide-way 60 for a purpose which will be hereinafter explained. 61 designates a gear secured to shaft 50 which meshes with a gear 62, secured to shaft 63, also secured to shaft 63 is a narrow gear wheel 64 moving in a suitable opening in the frames 1 and 2 and also through a slot in the guide-way 65 for a purpose which will be hereinafter explained. This terminates the double parts numbered as one and working in unison on each side of the machine, see Figs. 1, 2, 27, 29, 30 and 31.

66 designates a gear which is loosely mounted on a shaft 45 and which is prevented from moving sidewise by the fork 67 which extends into the groove 68 of the wheel 66.

69 designates a clutch formed on the end of the hub of the wheel 66 and the forks of which mesh with a similar clutch 70 which slides on a shaft 45 and is caused to rotate therewith by the key 71, the lever 72 is for the purpose of throwing the clutch in and out of engagement with the gear 66 by means of the pins 73 which act in a suitable groove in the clutch 70.

74 designates a gear meshing with gear 66 secured to shaft 75 which rotates in a bearing 76 bolted to the frame 2.

77 designates a gear which meshes with a gear 74 secured to shaft 78 which rotates in the bearing 76, the end of the shaft 78 being an eccentric 79 which oscillates the eccentric rod 38 hereinbefore mentioned, see Figs. 1 and 26.

80 designates a cam in the groove of which runs the friction roller 81 which is pivoted to the end of the lever 82 rocking on a pivot 83 in a suitable bearing on the side of the frame 1, the other end of the lever 82 going through a suitable hole in the plate 22 and engaging a slot in the guiding comb 84 for a purpose which will be hereinafter explained, see Figs. 1, 2, 24 and 25.

85 designates a bevel gear secured to the shaft 50 which meshes with a larger gear 86 secured to shaft 87 which rotates in suitable bearings in the frames 1 and 2, also secured to the shaft 87 is a drum 88 through the rim of which suitable holes 89 are drilled for a purpose which will be hereinafter explained, see Figs. 2, 4, 21 and 23.

90 designates a bevel gear which meshes with another bevel gear 91 secured to shaft 92 rotating in suitable bearings in the frames 1 and 2, and to which is secured an eccentric 93 which oscillates a rod consisting of the straps 93ª, rod 94 and joint 95 which is pivoted to the bell crank lever 96 secured to shaft 97 journaled in suitable bearings on the frames 1 and 2. Also pivoted to the bell crank lever is the joint 98, rod 99 and joint 100 which is pivoted to the slide 101 guided by the gib 103 and sliding in the ways 102 bolted to the frames 1 and 2.

104 designates a bar screwed to the slide 101 having suitable grooves in which are placed the ejecting pins 105, said pins being clamped by the bar 106 by suitable screws.

107 designates a heavy plate extending across the end of the machine and bolted to the frames 1 and 2 and which forms a support or backing for the match carrier plate 108, having teeth 110 on their ends which mesh with the gears 59 and 64 for a purpose which will be hereinafter explained. The plates 108 have holes 111 drilled through them and which are slightly countersunk and in which the splints are inserted, these plates are secured by screws to a standard malleable iron link chain which form an endless flexible match carrier.

112 designates a bracket on top of the plate 22 through the holes of which the forks 40 are entered.

113 designates the plate on which is secured the bearings 9, 10 and 13.

114 designates a brace pipe between the frames 1 and 2 and which is clamped by the long bolt 115.

116 designates the side cams on the drums 14 and 117 designates the cam slot on its periphery.

The mode of operation is as follows:— Motion being imparted to shaft 3 from any suitable source as by a belt running on pulley 4 which rotates gear 6 meshing with the large gear 7, which also meshes with a similar gear 11, thus rotating the large drums 14, it will be noted that there are two of these drums and that they rotate in opposite directions and that the sides form the cams 116 and there is also a cam slot 117 on the periphery, referring to Figs. 1, 3 and 4 it will be seen that the friction rollers 16 ride on the side cams 116 and actuate a vertically moving slide 15 and in this vertically moving slide there is another slide 19 which moves longitudinally of the machine, the slide 19 being actuated by the friction roller moving in cam slot 117 on the periphery of the drum 14, see Fig. 4. Assuming that the drum and slides are in the position as shown in Figs. 2, 3 and 4 it will be noted that the rotation of the drum 14 will by means of the cam slot 117 move the slide 19 to the left, see Fig. 2, the slide 15 being in its lower position on the small diameter of the side cams 116, the continued rotation of the drum 14 will bring the slide 19 to the left and of course under the grooved splint plate 22, until the slide 19 and inserter head 21 are in the position shown in Figs. 14 and 15 and directly under the slot 24, see Fig. 20, the cam slot 117 not now moving the slide 19, the side cams 116 now lifting up the vertical moving slide 15 and bringing the slide 19 and inserter head 21 in the position shown in Figs. 16 and 17, the cams 116 now holding the slide 15 in this position while the cam slot 117 moves the slide 19 to the right until it is in the position shown in Fig. 18, when the cam slot 117 holds the slide 19 stationary and the cams 116 lower the slide 15 to the position shown in Fig. 19 and then holding the slide 15 in this position while the cam slot 117 moves the slide 19 to the left again until it occupies the position shown in Fig. 14, which is a complete movement of the inserter head 21 and the purpose of which will be hereinafter explained. As has hereinbefore been explained the cams are so shaped that when the vertical movement ends the longitudinal movement begins and when this ends the vertical movement again takes place and when this ends the longitudinal movement again begins and these four movements will be called as follows, the first or upward vertical movement, see Figs. 14, 15 and 16; the second or forward movement, see Figs. 16 and 18, the third or downward vertical movement, see Figs. 18 and 19, and the fourth or backward movement or that movement from the position shown in Fig. 19 to that in Fig. 14.

Referring to the splint hopper composed of the parts 28, 29 and 30 and which are secured to the top of the grooved splint plate 22, it will be noted that the back plate 29 and side plates 30 are higher than the front plate 28 and the purpose of which is as follows:—The hopper is filled with splints to above the level of the plate 28 and to facilitate keeping the hopper full of splints the back plate 29 is higher so that the splints can be butted or bumped against this plate when placing the splints between the sides 30, both hands usually being employed in doing this by interlocking the fingers and extending the thumbs which permits the operator to place large handfuls of splints in the hopper.

The vibrating partitions are set in motion by the rotation of the shaft 12 through the gears 42, 43, and 44 and clutch 69 and 70, gear 66, 74 and 77 and eccentric 79 and eccentric rod 38 connecting bar 37 and arms 36, see Figs. 1 and 26.

Referring to Figs. 5, 6, 7, and 8 it will be noted that the tongue 33 of the plate 30 and the grooves 32 of the vibrating partitions 31 are for the purpose of preventing any splints from falling out or getting jammed between the said plate 30 and the partitions 31. The vibrations of the partitions 31 cause the splints to fall into and fill the grooves 23 of the plate 22 with splints, as the slot 26 is but half the thickness of the splint it does not fall through. The tongues 34 of the partitions 31 extend into suitable grooves 27 of plate 22 and which grooves run at right angles to the grooves 23 and thus permit the vibrating partitions 31 to vibrate freely without jamming or breaking any of the splints and dividing the hopper into narrow partitions has a tendency to keep the splints parallel with one another, the partitions being spaced about the length of a splint apart and each partition filling its nest of seven grooves. I do not wish to be limited to the number of grooves in a partition or of using seven partitions to the machine. I have simply chosen this number as being most convenient but it is understood that the number of grooves and partitions can be increased or decreased without departing from the spirit of my invention.

If it is desired to stop the feeding of the splints and still allow the balance of the machine to operate, the fork 40 is inserted in the guide 112, (see Figs. 3 and 26) and which also enters the holes 39 in the vibrating partitions 31, these holes being large enough to permit the entrance of the fork 40 and still permit the partitions 31 to keep on vibrating and this fork lifting the splints away from the plate 22 thus stopping the feeding of the splints, see Figs. 7, 8 and 11. It is sometimes desirable to have the machine keep on running until all the splints have been made into matches and these ejected from the machine. As there would be no useful object attained in keeping the partitions 31 vibrating this can be stopped by throwing out of engagement the clutch 69 and 70 by pushing the handle 72 to the right as shown in Fig. 26. It must not be assumed however that the stopping of the vibration of the partition 31 will stop the feeding of the splints as the jarring of the other working parts of the machine would cause some of the splints to fall in the grooves and for this reason the fork 40 is inserted so that the nonfeeding of the splints is positive. The vibration of the partitions having now filled the grooves with splints it is now desired to eject the same and insert them in the match carrier plate which is accomplished as follows:—Referring to Fig. 20 it will be noted that there are slots 24 going through the plate 22 and it is through this slot that the upward movement of the inserter head 21 takes place (the four movements of the inserter head 21 having already been explained) until it is in the position as shown in Figs. 16 and 17 and it will be noted that the upper part of the inserter head 21 consists of a cylindrical part which closely fits the groove 23 and the neck or body of which fits in the slot 26 and slides therein during the forward movement of the said inserter head 21 until it arrives in the slot 25 (see Fig. 18) which is the same as slot 24, when the downward movement takes place, which is sufficient to bring the top of the inserter head 21 just a little below the bottom of the plate 22 and thus permit its backward movement while being outside of the plate 22, see Fig. 19.

Assuming the splints are in the grooves 23 and the inserter head 21 is in the position shown in Fig. 21, the forward movement of the inserter head 21 will carry with it the splint and insert the same in the holes 111 of the match carrier plate 108 as shown in Fig. 22. The movement of the plate 108 will be explained hereinafter. Referring to Fig. 22 there will be noted a movable guiding comb 84 which is directly above the inserter head and the splint, and which assists in guiding the splints to the holes 111 in the plate 108, and the area of which hole is somewhat less than the area of the splint and which pinches and holds the splint after same has once been inserted therein. Should there be any short or broken splints in the groove 23 they will be apt to fall through the slot 25 which is about one-third the length of the splint and should the splint be longer than this and yet not a full length splint it will not enter the plate 108 but will lie in the groove 23 at the right hand end of the plate 22 if however, the next splint is full length it will push the short splint completely through the holes 111 in the match carrier plate and also through the holes 89 in the abutment drum 88 until the short splint falls down inside of this drum. The bevel cut in the slot 25, as shown in Fig. 21, facilitates the falling out of the shorter splints. Referring to Fig. 13 it will be noted that the slot 26 is but half the width of the groove 23 and that a splint can easily fall in the groove 23 and yet not fall through the slot 26 which is narrow enough so that this does not occur and yet permits the splint to slide easily in the groove 23, the slot 26 extending through the plate 22 only between the slots 24 and 25, it will be further noted that as the return or backward movement of the inserter head 21 is outside of the plate 22 this permits an exceptionally long length of time for the splints to fill the grooves 23, the time occupied in pushing the splint out of the groove 23 being so exceptionally short that it permits the splints to feed more easily and also greatly increasing the capacity of the machine.

Referring to Fig. 24 in which is shown the guiding comb 84 which in the position shown, covers the grooves 23 and guides the splints to the holes 111 in the plate 108 and to permit the upward movement of the splint it is necessary to move the guide comb 84 to one side so that the splints may pass through the spaces in the said comb, which is accomplished as follows:—The rotation of shaft 8 rotates gear 42 meshing with gear 43, this meshing with gear 44, secured to shaft 45 to which is also secured the cam 80, in the groove of which runs the friction roller 81, which rotates on a suitable pin secured to the end of the lever, this lever which is pivoted at its center and the other end going through a hole 22 and engaging a slot in the guiding comb 84, see Figs. 1 and 2, the contour of the cam 80 being such that during the time that the splint is moving upward in the match carrier plate, the comb 84 is moved to one side so as to bring the spaces in line with the splints as shown in Fig. 25 during the insertion of the splints by the inserter head 21 it again moves it so as to cover the grooves 23 as shown in Figs. 21, 22, 23 and 24. The match carrier plates are shown in Figs. 9 and 10 and consist of a thin strip of steel having three rows of holes drilled through the plate and being countersunk on both sides so as to facilitate the entering of the splints and the holes being small enough to hold the splint tight. The holes are spaced so as to exactly match the grooves 23 in the stationary splint plate 22, the carrier plate being screwed to a standard malleable-iron link chain, which thus forms a simple and inexpensive flexible endless carrier, the ends of the plate 108 are milled out to form teeth which mesh with the registering gears 59 and 64, the purpose of the teeth in the ends of the plate being to cause the holes 111 to register exactly in line with the grooves 23 in the plate 22. It will be noted that there are three teeth in the end of the plate, the teeth being in line with each row of holes. The registering of the holes 111 in the plate 108 with the grooves 23 in the plate 22 and locking them in that position is accomplished as follows:—As has been hereinbefore explained beginning with the number 42 and ending with 65 there are two parts to each number placed on both sides of the machine and working in unison with one another. Beginning with gears 42 which are rotated by shafts 8 and 12, these gears set in motion gears 43 and 44 which cause the shaft 45 to rotate, secured to the end of shaft 45 is a disk 46 on the face of which is secured a suitable pin on which rotates the friction roller 47 during a half revolution of the disk 46, this roller is caused to enter one of the slots 48 of the wheel 49 and moving the same one space, the periphery of the disk is shaped into a suitable cam on which rides the friction roller 51, which rotates on a suitable pin secured to the lever 52 which is pivoted on the shaft 51ª in the bracket 58. This lever 52 also has a tooth 53 which rests in a notch 54 in the wheel 55, the other end of the lever 52 terminates in the right angle part 56 to which is hooked a spring 57 which always keeps the tooth 53 in the notch 54 in the wheel 55 except when lifted out of contact by the cam of the disk 46 which strikes against the friction roller 51, and lifts the tooth 53 out of contact with the notch 54, the cam being so shaped that it lifts the tooth out of contact during the time that the friction roller 47 is moving in the slot 48 and turning the wheel 49 and when the friction roller 47 is out of the slot 48 the cam permits the tooth to engage its notch and lock the wheels 49 and 55 in place, both being secured to the shaft 50, see Figs. 1 and 2 and Figs. 31 to 35. Also secured to shaft 50 is the registering gear 59 and the teeth of which mesh with the teeth 110 of the match carrier plate 108, there are as many slots in the wheel 49 and notches in the wheel 55 as there are spaces or teeth in the registering gear 59 and these are so spaced that the holes 111 in the match carrier plate 108 are caused to register exactly in line with the groove 23 on the plate 22 and be locked in position during the insertion of the splint, the gears 59 passing through a suitable opening in the guides 60, which are secured to the inside of the frames 1 and 2, also secured to shaft 50 is the bevel gear 85 which meshes with bevel gear 86 secured to shaft 87, also secured to shaft 87 is the abutment drum 88, which forms a backing to support the plates 108 during the insertion of the splints as shown in Figs. 2, 4, 21, 22, 23, 24 and 25. The abutment drum prevents the plate 108 from springing out of place during the insertion of the splint and it has holes 89 drilled through the rim somewhat larger than the holes 111 in the plate 108 and are so spaced that they register therewith, these holes, as has been hereinbefore explained permit short splints to be punched through them and fall inside of the drum. Also secured to shaft 50 is a gear 61 meshing with a gear 62 on shaft 63 to which is secured a registering gear 64 which extends through a suitable opening in the frames 1 and 2 and also into the guides 65, see Figs. 2, 27 and 29, and which cause the plate 108 carrying the finished matches to register with the ejector head as shown in Figs. 2, 27 and 28, the ejector head is reciprocated by means of the joint 100, rod 99 and joint 98 pivoted to bell crank lever 96 to which is also pivoted the joint 95, rod 94, eccentric-strap 93ª oscillated by eccentric 93 secured to shaft 92 to which is also secured bevel gear 91 meshing with bevel gear 90 secured to shaft 3. The bell crank lever 96 has several holes to which the joint 95 can be pivoted so as to vary the throw of the ejector head.

It will be noted that the bars 94 and 99 have right and left hand threads so as to adjust the slide 101 as may be desired, the ejecting pins 105 are held in a plate 104 and clamped in place by the plate 106 with suitable screws, the pins 105 are firmly held and easily replaceable by means of the construction shown. The registering gear 64 moves the plate 108 in place and holds same in locked position on account of the meshing of the gears 61 and 62 and the locking device as has been heretofore explained (see Fig. 2). The ejecting pins 105 enter the holes 111 of the match carrier plate 108, the plate 107 preventing the springing of the plate 108 during the ejectment of the matches, see Figs. 27, 28 and 29, the teeth 110 of the match carrier plate 108 are not for the purpose of moving the endless match carrier but for the purpose of registering the holes 111 of the plate 108 with the inserter and ejector head. The links 109 form the endless chain which carries the match carrier plates 108 over the heating device, paraffin pan, dipping devices and drying wheels, which I have not shown, as these can be of any one of the different devices which are now used for this purpose.

The registering devices I have shown are simple and accurate and are positively locked during the time needed for inserting the splints and ejecting the matches and being operated from both sides of the machine divides the strain between them.

The actual construction of the inserter head and slide 19 is not shown, the former being held in a suitable piece of steel and this is then clamped to the slide 19. The upper part of the inserter head may be made to fill the groove 23 instead of being cylindrical as shown. It will also be noted that for clearness of illustration I have shown but three grooves and three ejectors between each partition in Figs. 3 and 4. It is also plainly seen that the holes 39 in the partitions 31 can have the lower part cut away thus leaving a slot for the insertion of the fork 40.

The drums 14 rotate in opposite directions and the cams are so shaped that they work in unison, thus dividing the strain between them and thrusting against one another, thus avoiding the excessive friction of the slides which would occur if only one drum was used, although it is plainly seen that one drum would make the necessary movements.

The side of the frame 15 is carried down below the side cams 116 and carries the lower friction rollers 16 so that the down movement is positive and not on account of the weight of the slides.

The endless carrier chain composed of the links 109 are caused to move by the usual sprocket wheels which are made for them. It will be noted that the motion of the chain is intermittent in the machine and continuous away from same, which is accomplished by allowing a short length of the flexible carrier to hang between two sprocket wheels one of which runs continuously and the other intermittently in unison with the motion of the chain through the machine as shown and explained.

Having thus described my invention what I claim as new and desire to secure by Letters Patent are as follows:—

1. In a match making machine, a grooved splint plate having grooves for the reception of splints, a hopper adapted to contain splints, vibrating partitions therein and a tongue or part thereof extending into or below the top of said grooved splint plate.

2. In a match making machine, a grooved splint plate having grooves for the reception of splints, a hopper adapted to contain splints, pivoted vibrating partitions therein and a tongue or part thereof extending into or below the top of said grooved splint plate.

3. In a match making machine, a grooved splint plate having grooves for the reception of splints, a hopper adapted to contain splints, pivoted vibrating partitions therein and a tongue or part thereof extending into or below the top of said grooved splint plate and said partitions vibrating in unison.

4. In a match making machine, a stationary grooved splint plate having grooves for the reception of splints, a hopper adapted to contain splints and having vibrating partitions therein and a cut-off device adapted to be slidably inserted between the splints in the hopper and the grooved splint plate to prevent the splints from entering the grooves in said plate.

5. The combination of a hopper adapted to contain splints and having vibrating partitions therein with openings therethrough of a cut-off device movable into and through such openings.

6. In a match making machine, a grooved splint plate having slots therethrough equal in width to the splint groove and in line therewith and an inserter head adapted to enter and leave the grooved splint plate through the said slots.

7. The combination of a grooved splint plate having grooves 23 for the reception of splints, slots 24 therethrough equal in width to the groove 23 and in line therewith, similar slots 25 therethrough and narrower slots 26 extending from slots 24 to slots 25 and an inserter head adapted to enter slots 24, slide through slots 26 to slots 25, ejecting the splints from grooves 23 and inserting same in a match carrier plate and withdraw from said grooved splint plate through the latter slots, substantially as described.

8. In a match making machine, a hopper adapted to contain splints, vibrating partitions therein, a grooved splint plate having a series of grooves for the reception of splints and transverse grooves between each series of splint grooves to permit the free ends of the vibrating partitions to move therein.

9. In a match making machine, a hopper adapted to contain splints, vibrating partitions therein, a grooved splint plate having a series of grooves for the reception of splints and transverse grooves between each series of splint grooves to permit the free end of the vibrating partitions to move therein and prevent the splints of one compartment from moving into the next.

10. In a match making machine, a grooved splint plate having grooves for the reception of splints and having slots therethrough equal in width to the splint groove and in line therewith and a narrower slot between them for the movement of an inserter head, and an inserter head engaging the splints whose length is equal to or greater than the thickness of the grooved splint plate to insure sufficient strength to positively insert the splint in the holes of the match carrier.

11. In a match making machine, a grooved splint plate having grooves for the reception of splints and having slots therethrough equal in width to the splint groove and in line therewith and a narrower slot between them for the movement of an inserter head and an inserter head having an elongated cylindrical head of a cross-sectional area equal to or greater than the cross-sectional area of a splint.

12. In a match making machine, a grooved splint plate having grooves for the reception of splints and having slots therethrough equal in width to the splint groove and in line therewith and a narrower slot between them for the movement of an inserter head and an inserter head having a head or part thereof fitting the groove in which the splint lies and a neck or body of approximately half the thickness of a splint and sliding in a slot in the center of said groove.

13. In a match making machine, a grooved splint plate having grooves for the reception of splints and having slots therethrough equal in width to the splint groove and in line therewith and a narrower slot between them for the movement of an inserter head having an enlarged head and means for causing said head to enter the plate slide splints therefrom and insert them into a match carrier, withdraw from said plate and return to the starting point outside of said plate.

14. The combination of a grooved splint plate having grooves for the reception of splints and having slots therethrough equal in width to the splint groove and in line therewith and a narrower slot between them for the movement of an inserter head and drums having cams on their sides adapted to raise and lower a vertically moving slide carrying a longitudinally moving slide with an inserter head which moves the head into and out of the grooved splint plate and a cam slot on the periphery of said drums adapted to move the inserter head so as to push the splint out of said splint groove and insert same in a match carrier plate.

15. The combination of a hopper adapted to contain splints, a grooved splint plate having grooves for the reception of splints and having slots therethrough equal in width to the splint groove and in line therewith and a narrower slot between them for the movement of an inserter head and oppositely rotating drums having cams on their sides and periphery operating combined vertical and longitudinal moving slides carrying an inserter head, said cams being so shaped that the thrust is against one another and causing the four movements of the inserter head substantially as described.

16. In a match making machine, a grooved splint plate having grooves for the reception of splints and having slots therethrough equal in width to the splint groove and in line therewith and a narrower slot between them for the movement of an inserter head and means for causing the latter to enter the grooved splint plate, slide splints therefrom and insert same in a match carrier plate and a movable guiding comb on top of said grooved splint plate guiding the splint during the insertion thereof in the match carrier plate.

17. In a match making machine, a grooved splint plate having grooves for the reception of splints and having slots therethrough equal in width to the splint groove and in line therewith and a narrower slot between them for the movement of an inserter head and means for causing the latter to enter said grooved splint plate, slide splints therefrom and insert same in a match carrier plate and a movable guiding comb on top of said grooved splint plate guiding the splint during the insertion thereof in a match carrier plate and means for moving the comb laterally so that the spaces in the comb will register with the grooves in the plate to permit the upward movement of the splints.

18. A splint carrier for match machines comprising perforated plates having teeth at their end edges for engagement with positioning or holding means in combination with chains connecting said plates and comprising linked sections each secured to one face of a plate and having at one end projecting over the edge of the plate a hook to engage the end bar of the link on the next adjacent bar.

19. The combination with a match splint carrier comprising perforated plates having teeth on their end edges of a splint row inserting mechanism, a backing roller whose axis is in the plane of the splint row feed and which is geared at each end to gear wheels lying in the plane of the splint plate at the place of splint insertion and whose teeth engage the teeth on the end of the plate, of means for intermittently rotating and locking said gears.

20. The combination with a match splint carrier comprising perforated plates having teeth on their end edges of a splint row inserting mechanism, a backing roller whose axis is in the plane of the splint row feed and which is geared at each end to gear wheels lying in the plane of the splint plate at the place of splint insertion and whose teeth engage the teeth on the end of the plate, a splint ejecting mechanism and gears located at the plane of operation of said ejecting mechanism engaging the teeth of the plate and indirectly intergeared with the first mentioned gears for engaging the plates, of means for intermittently rotating and automatically locking said gears.

21. In a match making machine, a match carrier plate moving in a guideway, means for inserting splints therein, an abutment drum supporting the match carrier plate and holes in the rim of the abutment drum to permit short splints to be punched therethrough.

22. In a match making machine, a match carrier plate moving in a guideway and supported by an abutment drum, said drum and match plate being actuated from and locked by the same means and holes in the drum registering with the holes in the match carrier plate.

23. In a match making machine, a grooved splint plate having grooves for the reception of splints, a match carrier plate moving in a drum, said drum and match plate being actuated from and locked by the same means and holes in the drum and match carrier plate registering with the grooves of the splint plate.

24. In a match making machine, a grooved splint plate having grooves for the reception of splints, an inserter head having a section or part thereof enlarged for inserting splints in perforated match carrier plates, said grooved splint plate having suitable slots in same to permit the entrance, movement and exit of said inserter head substantially as described.

25. In a match making machine, a grooved splint plate having grooves for the reception of splints and suitable slots therein for the movement of an inserter head and laterally moving comb on top of said splint plate covering a section or part of said grooves and forming a guideway for the proper insertion of the splint in perforated match carrier plates.

26. In a match making machine, a grooved splint plate having grooves for the reception of splints and suitable slots therein for the movement of an inserter head and one of said slots having a beveled section to facilitate the falling out of short or imperfect splints.

27. In a match making machine, a grooved splint plate having grooves for the reception of splints, and slots therethrough equal in width to the splint groove and in line therewith and a narrower slot between them for the movement of an inserter head and means for causing a parallelogram movement of said inserter head for inserting splints in a match carrier.

28. In a match making machine, a grooved splint plate having grooves for the reception of splints, a hopper adapted to contain splints, vibrating partitions mounted in said hopper and having notches at their pivotal ends, the sides of said hopper having tongues extending into the notches at the pivoted ends of the vibrating partitions and in a vertical line therewith.

29. In a match making machine, a hopper adapted to contain splints, vibrating partitions therein and a grooved splint plate in which the splint grooves are arranged in series having a space between each series of grooves for the movement of the hopper partitions.

30. In a match making machine, a grooved splint plate having grooves for the reception of splints, and suitable slots therein for the movement of an inserter head, means for causing a parallelogram movement of said inserter head, a movable comb on top of said grooved splint plate at the place of splint insertion and means for causing a lateral reciprocating movement of said comb.

31. In a match making machine, a grooved splint plate having grooves for the reception of splints, and suitable slots therein for the movement of an inserter head, means for causing a parallelogram movement of said inserter head, a movable comb on top of said grooved splint plate at the place of splint insertion, means for causing a lateral reciprocating movement of said comb in combination with perforated match carrier plates and means for locking said comb and plate during the time of splint insertion.

32. In a match making machine, a grooved splint plate having grooves for the reception of splints and a narrow slot in the center of said grooves for the movement of an inserter head, and an inserter head having a head or part thereof, fitting the groove in which the splint lies and a neck or part thereof of approximately half the thickness of a splint and sliding in the aforesaid narrow slot.

FRANK SCHAFER.

Witnesses:
G. C. POPLIN,
W. A. STROUD.